Nov. 12, 1940.                    M. TANZI                    2,221,334
                              MACARONI FILTER
                           Filed March 6, 1936            4 Sheets-Sheet 2

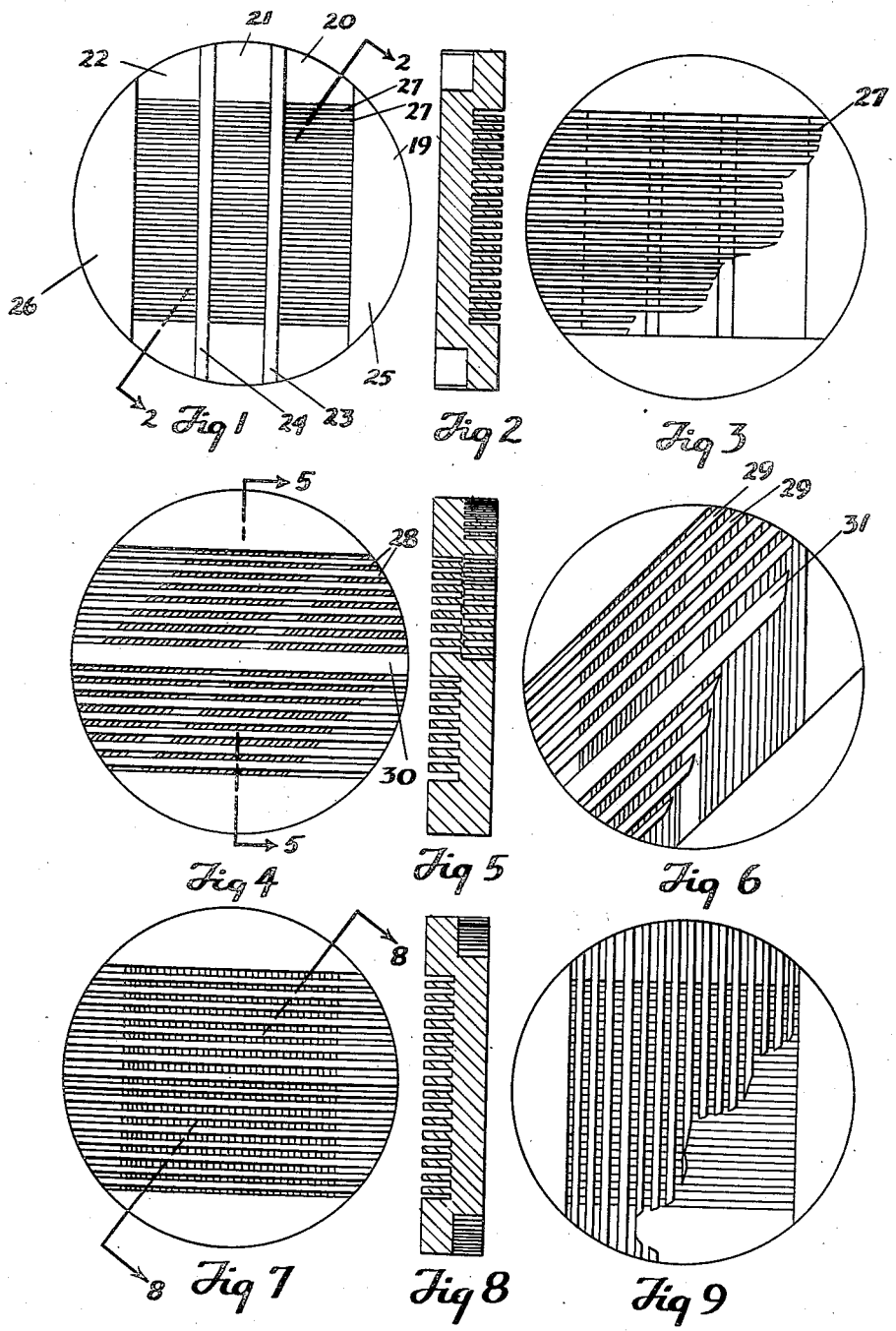

INVENTOR
Mario Tanzi
BY
Ezekiel Wolf
ATTORNEY

Nov. 12, 1940.　　　　　　M. TANZI　　　　　　2,221,334
MACARONI FILTER
Filed March 6, 1936　　　　　　4 Sheets-Sheet 3
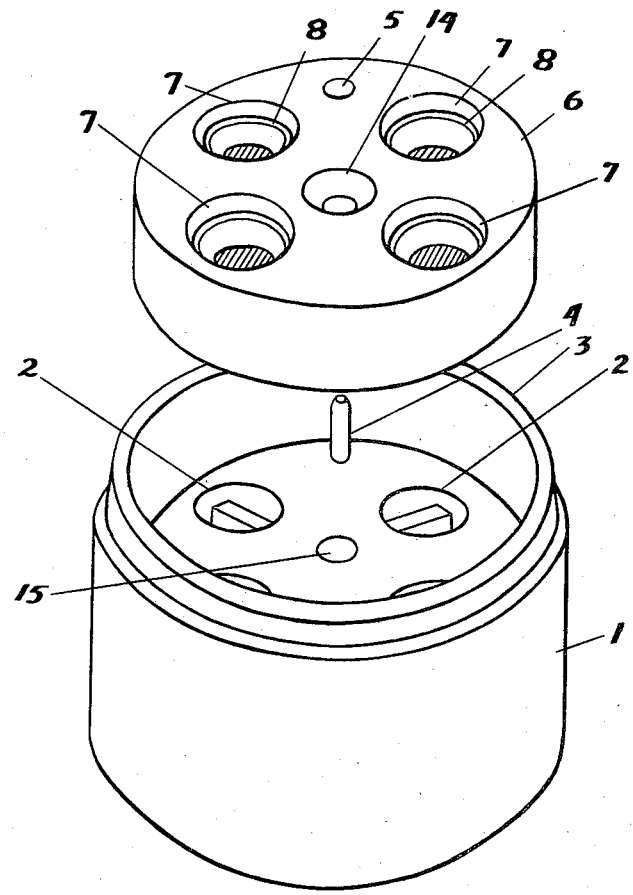
Fig. 12
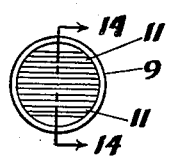 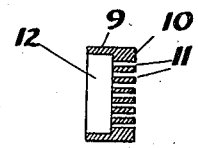 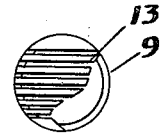
Fig. 13　　Fig. 14　　Fig. 15
INVENTOR
Mario Tanzi
BY
Ezekiel Wolf
ATTORNEY Nov. 12, 1940.    M. TANZI    2,221,334
MACARONI FILTER
Filed March 6, 1936    4 Sheets-Sheet 4

INVENTOR
Mario Tanzi
BY Ezekiel Wolf
ATTORNEY

Patented Nov. 12, 1940

2,221,334

UNITED STATES PATENT OFFICE 2,221,334

MACARONI FILTER

Mario Tanzi, Chicago, Ill.

Application March 6, 1936, Serial No. 67,522

4 Claims. (Cl. 107—14)

The present invention relates to filters which are used in a macaroni press or such types of presses where macaroni products are formed.

A number of types of presses are common in the prior art. In most of these presses the dough or paste is admitted at the top and forced down through a cylinder by means of a piston through a base plate in which the dies for forming the macaroni are inserted.

In presses of this type, it is difficult to use a filter so that foreign particles, such as pieces of wood, string, or the like, often pass into the small dies at the base plate and clog them up in such a fashion that no usable macaroni is produced. It happens frequently that the press must be stopped under these circumstances and the die elements removed and this materially reduces the production of the press.

Screen filters have been used in the past but such filters do not stand up well and further have a tendency to build up such an enormous pressure in the press itself as to seriously impede their regular operation.

In the present invention, I have devised a filter applicable to macaroni die presses which prevents foreign matter such as pieces of wood, string, hard dough and the like from passing to the plugs or die elements on the base plate, and which at the same time does not impede the operation of the apparatus, and in fact tends to make the macaroni dough finer and more uniform and pass through the press in a perfectly uniform manner producing a macaroni that is always perfect. With this type of a filter, the progress of the dough through the press is impeded but very little, and the pressure required is substantially no greater than if the filter were omitted.

The invention will be more fully described in the following specification, taken in connection with the drawings which show an embodiment of the invention in a number of modifications.

Figure 1 shows a plan view of the die filter looking from one end.

Figure 2 shows a section on the line 2—2 of Figure 1.

Figure 3 shows a view of the filter in Figure 1, looking from the opposite end.

Figure 4 shows a view of a modification of the filter shown in Figure 1 looking from one end.

Figure 5 shows a section taken on the line 5—5 of Figure 4.

Figure 6 shows the filter shown in Figure 4 as viewed from the opposite side.

Figure 7 shows a further modification of the filter of Figure 1 viewed from one side.

Figure 8 shows a section taken on the line 8—8 of Figure 7.

Figure 9 shows a filter of Figure 7 as viewed from the opposite side.

Figure 12 shows a further modification in assembly.

Figure 13 shows a detail of the filter element of Figure 12.

Figure 14 shows a section taken on the line 14—14 of Figure 13, and

Figure 15 shows a view of the detail shown in Figure 13 as viewed from the opposite side, the view being partly fragmentary.

Figure 10:
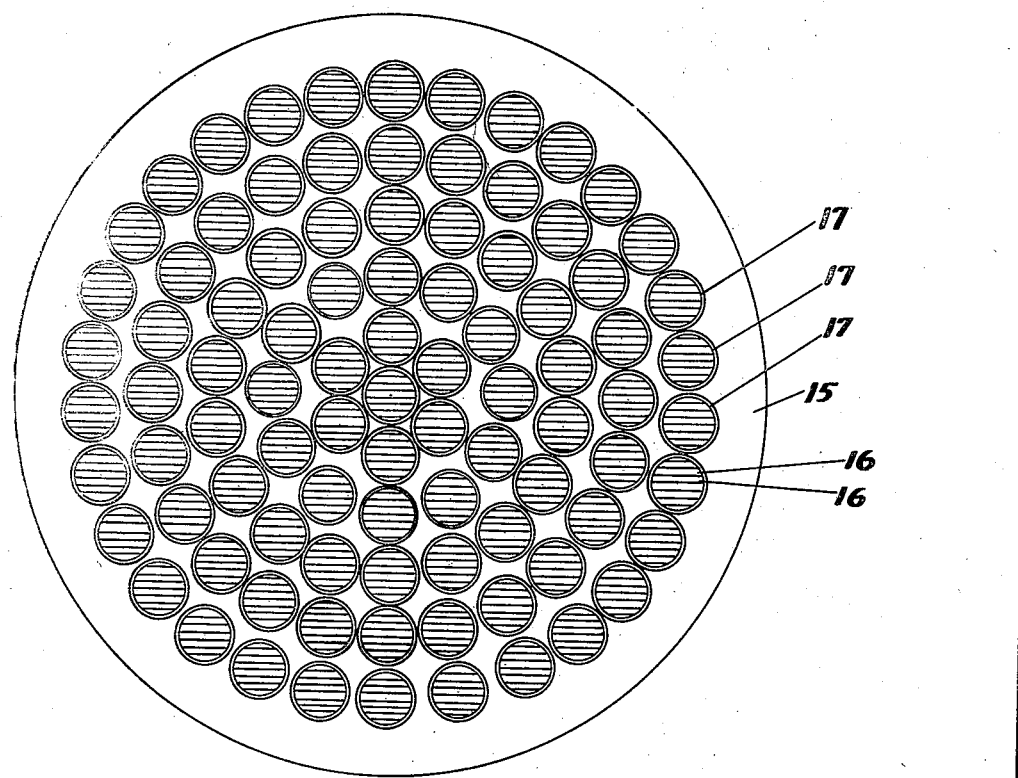
Figure 10 shows a further modification of the filter of Figure 1, looking from the top, and, Figure 11 shows a fragmentary view of the filter, of Figure 10 looking from the opposite side.

It should be understood that the filter shown in all of the drawings are usually of such size and dimensions as to fit into the cylindrical macaroni presses. These filters may therefore range anywhere from the size indicated in the present drawings to the size of the usual macaroni press. In the latter case the entire general dimensions of the filter itself may vary, but the spacing of the openings for the dough to pass, remain substantially the same.

As indicated in this connection, there is indicated in Figure 12 the base plate 1, in which there may be provided many perforations, such as indicated by the numbers 2, 2. In these perforations the macaroni die element or plug is placed. This element is shown in my copending application Serial No. 706,515, filed January 13, 1934, and which issued Dec. 1, 1936, as Patent No. 2,062,338, and in general comprises a circular die opening or the like of such a nature and character as to produce the macaroni desired. These plugs or die elements as will be noted from the companion specification are provided with various cuts and passages to give the dough as it passes through the die plug the desired motion to produce the desired macaroni. These plugs at their external end are provided with certain definite size openings and it should be noted throughout the present invention that the openings in the filters themselves are smaller in width than the openings of the die plugs. The differences are very slight and amount to no more than a few thousandths of an inch the purpose being to allow any material that passes through the filter to pass through the plug itself so that there is never any stoppage of the passage of the dough beyond the point of the filter itself and in order to avoid any stoppage in the die plug.

The plate 1 as indicated in Figure 12 is provided with an upwardly extending wall 3 at its edge and a pin 4 which is positioned to engage the hole 5 in the filter plate 6. The filter plate 6 is similarly provided with a plurality of perforations 7, 7, etc., corresponding and positioned above the perforations for the die elements or plugs, 2, 2, etc. The perforations 7, 7, are provided with an inwardly extending shoulder, not shown, and are adapted to hold the filter plugs 8, 8, etc., which may be dropped into the perforations from the top as viewed in Figure 12.

The filter plugs are shown more in detail in Figures 13, 14 and 15. As indicated in these figures they comprise a cylindrical shell 9 and a base 10 which is slotted with slots 11, 11, etc., through to the shell opening 12, so that a clear opening is made from the top of the filter plug right through the base itself. As indicated by the end view in Figure 15, the shell 9 forms a support for the ribs 13 formed by cutting slots in the base 10. It will be noted as these filter elements are positioned in the die plug, the lower edges of the ribs 13 at their extremities rest upon the shoulder at the base of the filter plate and furnish a support for the ribs in this fashion, while at the top end, the cylindrical shell 9 furnishes a smaller protecting edge.

The spacing between the ribs as has been previously stated is always slightly less than the opening in the die plug, and in this manner the operator may be assured that the press will operate continuously without interruption due to blocking by foreign material. The center opening 14 may be provided in the filter plate, corresponding to the opening 15 in the die plate wherein the filter plate may be securely held to the die plate. The advantages of using individual filter plugs and positioning them opposite the die plugs is that if any filter plug should become worn and blocked through some foreign particles in the dough, that these plugs may easily be removed by a plug remover which is inserted at the lower end of the plate and forces the plug element upward and out of the plate. The structure shown in the other figures of the application are modifications of each other and of the apparatus shown in Figure 12.

Figure 11:
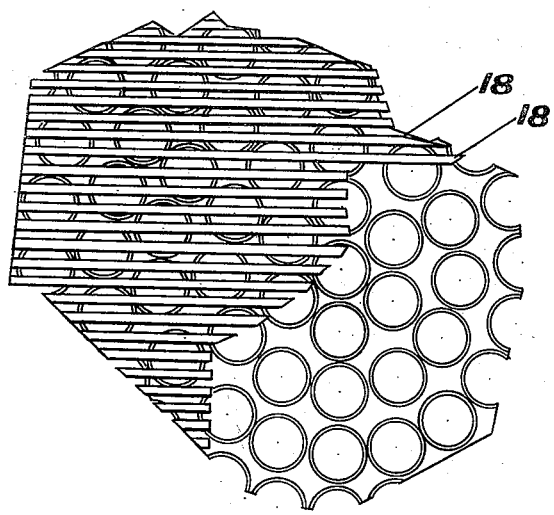

In Figures 10 and 11, the filter plate is shown as 15. This plate is formed as a single element by the cutting of perforations 17, 17, etc., spaced close together perpendicularly or otherwise in the top of the plate and by milling the bottom of the plate in parallel strips 18, 18, etc.

These parallel strips are milled across the entire plate and form parallel perforations through which the dough may pass after entering the circular perforations from the top of the plate. The milling of the strips is sufficiently deep to penetrate the base of the drilling of the holes from the top and form an unimpeded passage for the dough through the filter plate.

In the modifications shown in Figures 1 to 9, similar parallel perforations are shown cut in one way on one side of the plate, and in another way or direction on the other side of the plate. In the modifications shown in Figures 1, 2 and 3, the plate 19 is provided with a plurality of parallel milled passages 20, 21, and 22, separated by supporting webs 23 and 24 with side supporting elements 25 and 26.

The parallel milled passage 20, 21, and 22, as indicated, may be considerably wider than the cross milled passages 27, 27, etc., milled from the other side of the plate. These passages are indicated both in Figures 1 and 3, and as will be noted together form a perforation through the plate through which the dough passes.

In Figures 4, 5, and 6, the passages are cut in somewhat different fashion. The plate in Figure 4 as indicated is ribbed finely at one side by ribs 28, 28, etc., and on the other side by similar ribs 29, 29, etc., parallel but extending in a different direction than the ribs 28 on the other side of the plate. In order to strengthen the plate itself, wider ribs as 30 may be provided at various places in the plate at one side and similar ribs 31 on the other side. It will be noted that in the modification shown in Figures 4 to 6, a shredding of the dough in both directions occur, and this makes it impossible therefor for a string or any other element of that shape to pass down through the passage. The same purpose is accomplished in the modification shown in Figures 7, 8 and 9. In this case the ribbing on one side of the plate is perpendicular to the ribbing on the other side of the plate and provides a complete shredding of the material passing through the plate. In these last three modifications mentioned, it will be noted that the shredding is not accomplished simultaneously, but that first the dough is subjected to a combing in one direction and then suddenly to a combing in another direction, the result being that when the material enters the dough plug, it readily goes through the plug and is so uniform that a practically perfect macaroni is produced.

Figure 16:
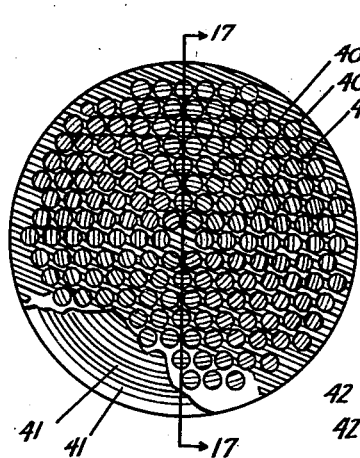
Figure 16 shows a view of a further modification with a fragmentary section at one side.
Figure 17:
Figure 17 shows a section on the line 17—17 of Figure 16.
Figure 18:
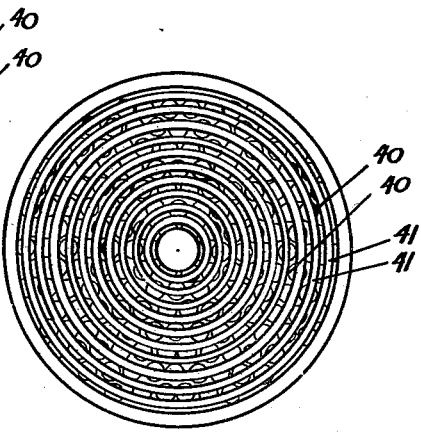
Figure 18 shows a view of the modification of Figure 16 looking from the rear of the view shown in Figure 16, and, Figure 19 shows a still further modification of a filter plate in fragmentary part.

In the modification shown in Figures 16 and 17 and 18, a complete filter plate is shown in which there is provided a plurality of circular openings 40, 40, etc., penetrating the plate from one side as indicated more clearly in Figures 16 and 17. These are arranged all over the plate and furnish openings through which the dough or paste emerges to the dies in the base plate upon which the filter rests. The openings 40 face downwards towards the dies, but need not be aligned with the die openings as in Figure 10, and therefore if the diameter of the filter is correct to fit the die plate at the bottom of the press, it does not matter if the die plate has more or less openings than the filter plate or if they are or are not aligned.

The top of the filter is provided with circular ring elements 41, 41, extending all the way around the filter plate and acting to filter any solid or large piece of material that will not pass through the die elements beneath the filter. On the lower side of the plate, the face of the plate is grooved or slotted as indicated at 42 substantially uniformly across the whole plate. In this fashion as the dough or paste emerges through the circular perforations or openings 40, if these do not happen to be eliminated with the die openings, the paste nevertheless will travel along the slots or grooves 42 to the die openings and fill the die openings in the proper fashion.

The filter plate as constructed makes it possible to rest the plate on the die plate, and therefore secure the necessary support to prevent the filter plate from being harmed in any way.

It will readily be seen that in the ararangement just described, the filter plate is independent, easily removed, and yet can be used with any type of die having the same size cylinder as the filter plate.

Figure 19:
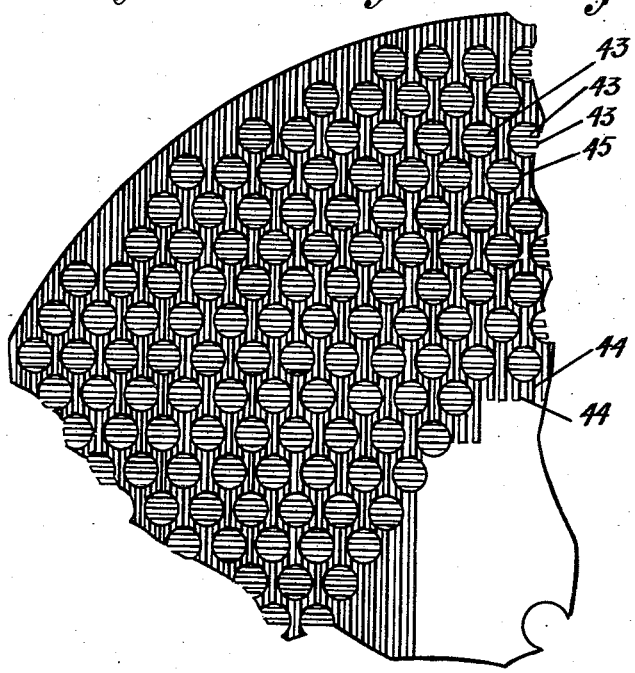

In Figure 19, a fragmentary view is shown of a slight modification of the device indicated in the three previous figures. In this arrangement the bar elements extend across the plate as indicated by the bars 43, 43, and are not circularly disposed as in the other figures.

At the bottom of the plate which is shown on top in Figure 19, the grooved elements 44, 44, are slotted upon the normal surface of the perforations 45 in a manner similar to that described in connection with the other three figures. In this case the plate rests upon the die plate and there is no need of the holes in the filter aligning with the holes in the die. It is also true that no matter how large the filter plate may be, there will be no difficulty in obtaining proper support for it as it is supported at the face edges of all of the grooves resting upon the die plate.

Various other modifications of the present invention may suggest themselves by the description of the embodiment in its various modifications given above, and the applicant therefore wishes it to be understood that such modifications as apply within the scope of the present specifications are included in the scope of the invention herein claimed.

Having now described my invention, I claim:

1. In combination with a macaroni die press having a base at one end of the press and a plurality of die elements positioned in the base, a plate positioned upon the base having die elements, said plate having milled therein a plurality of parallel passages extending through the plate and a plurality of supporting elements on one side of the plate and offsetting the plate from said base.

2. In a macaroni press, a filter plate having a plurality of perforations extending through the plate from one side thereof to the other said perforations comprising a plurality of holes formed on one side of the plate, a plurality of grooves formed on the other side of the plate the base of said grooves opening into the holes formed on the first mentioned side of the plate.

3. In a macaroni press, a filter plate having a plurality of perforations extending through the plate from one side thereof to the other, said perforations comprising a plurality of parallelly arranged grooves formed on one side of the plate a plurality of holes formed on the other side of the plate the bottom of said holes communicating with the bottom of said grooves and a plurality of grooves formed on the surface of the plate wherein the holes are formed, said grooves running in a direction across said holes.

4. In a macaroni press, a filter plate having a plurality of perforations extending through said plate from one side thereof to the other, said perforations comprising a plurality of parallelly arranged grooves on one side of the plate, a plurality of holes formed on the other side of the plate communicating with the base of said grooves and forming perforations through said plate, the surface of said plate on the side where the holes are formed being grooved substantially over its entire surface in a direction at an angle to the grooves formed on the other mentioned side of the plate.

MARIO TANZI.